United States Patent
Loveland

(10) Patent No.: US 6,290,278 B1
(45) Date of Patent: Sep. 18, 2001

(54) TRUNK LINER

(75) Inventor: Earl P Loveland, Lapeer, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/565,970

(22) Filed: May 5, 2000

(51) Int. Cl.[7] .................................................. B60R 13/01
(52) U.S. Cl. ..................... 296/39.1; 296/37.3; 296/97.23
(58) Field of Search ................. 296/37.1, 37.2, 296/37.3, 37.14, 37.16, 39.1, 39.2, 39.3, 24.1, 97.23; 224/42.13, 539, 540, 542, 541; 160/230

(56) References Cited

U.S. PATENT DOCUMENTS

| Re. 33,200 | 4/1990 | Reynolds et al. ................. 296/39.1 |
| 3,476,432 | 11/1969 | Aliment et al. ...................... 296/37 |
| 4,351,555 | 9/1982 | Hashimoto ...................... 296/37.16 |
| 4,533,169 | * 8/1985 | Rauthmann et al. ............... 296/37.2 |
| 4,801,169 | 1/1989 | Queen et al. ...................... 296/39.1 |
| 4,848,826 | 7/1989 | Kuwabara et al. ................ 296/97.23 |
| 5,322,335 | 6/1994 | Niemi ................................ 296/97.23 |
| 5,580,153 | * 12/1996 | Motz .................................... 262/80 |
| 5,842,730 | * 12/1998 | Schneider et al. ................... 296/37.3 |
| 5,971,462 | * 10/1999 | Bell et al. ............................ 296/37.3 |
| 5,979,962 | 11/1999 | Valentin et al. ..................... 296/37.1 |
| 6,003,921 | 12/1999 | Tozuka ................................. 296/37.2 |
| 6,033,003 | * 3/2000 | Bell et al. ............................ 296/37.3 |
| 6,102,464 | * 8/2000 | Scheider et al. ..................... 296/37.3 |

* cited by examiner

Primary Examiner—Joseph D. Pape
Assistant Examiner—Lori L. Coletta
(74) Attorney, Agent, or Firm—Mark P. Calcaterra

(57) ABSTRACT

The present invention provides an automotive vehicle having a trunk liner for the trunk of the vehicle. The trunk liner includes a first generally rigid board having a first width spanning over a sunken wheel well in the trunk floor. A second generally rigid board also having a width spanning over the sunken well of the trunk floor is foldably connected with the first board. A flexible membrane carpet cover is connected with and extends over the first and second boards. The flexible membrane cover extends over the first and second boards as well as the remainder of the automotive trunk region providing a carpet lining for the vehicle trunk.

15 Claims, 4 Drawing Sheets

TRUNK LINER

FIELD OF THE INVENTION

The field of the present invention is that of an automotive vehicle having a rear trunk and trunk liner. More particularly, the field of the present invention is that of an automotive vehicle with a rear trunk liner that incorporates a cap or door for a sunken well in which a spare tire for the vehicle is stored.

BACKGROUND OF THE INVENTION

Most automotive vehicles, especially passenger-type vehicles, have a trunk located in a rear region of the vehicle. The floor of the trunk typically has a sunken well for storage of a spare tire. With the exception of the sunken well, the floor of the trunk is typically covered with a blanket of sound insulation to prevent road noise from passing through the trunk region and into the passenger compartment via the rear seat of the vehicle. A carpet is installed on top of the sound insulation. The carpet usually covers the sunken well cap or door that encloses the spare tire, jack and wheel lug wrench. The tire stored in the sunken well may be a temporary small-size spare tire or a regular full-size spare tire. It is desirable to provide a trunk liner that essentially covers most of the trunk region of the vehicle and incorporates an enclosure door over the sunken well which stores the spare tire. It is desirable to provide a trunk liner that can be quickly assembled onto the trunk floor of an automotive vehicle. It is also desirable to provide an automotive vehicle trunk liner that will maintain its position within the trunk without the extensive use of fastening devices.

SUMMARY OF THE INVENTION

To make manifest the above-delineated desires, the revelation of the present invention is brought forth. In a preferred embodiment, the present invention provides a trunk liner for a trunk region of an automotive vehicle that has a conventional trunk floor having a rear portion with a sunken well for storage of a spare tire. The trunk floor rear portion also has side sections laterally adjacent the sunken well giving the trunk floor rear portion a first width. The trunk floor front portion is laterally bordered by raised wheel wells of the vehicle. The trunk floor front portion has a second width less than the first width. The trunk liner includes a first generally rigid board having a first width spanning over the sunken well extending over the trunk floor rear portion between the trunk floor rear portion side sections. A second generally rigid board having a width spanning over the sunken well is also provided. The second board has a rear edge extending over the sunken well. A rear edge of the second board is foldably connected with a front edge of the first board. A generally flexible carpet cover is connected with and extends over the first and second boards. The flexible carpet cover also extends over the trunk floor rear portion including the trunk floor rear portion side sections. The flexible carpet cover also extends over the trunk floor front portion. In a preferred embodiment, sound insulation is added with the carpet cover.

It is an object of the present invention to provide an automotive vehicle with a trunk liner which incorporates the carpet cover for the trunk floor and also includes an enclosure door for a sunken well which stores a spare tire. It is an object of the present invention to provide a trunk liner as described above which can be utilized when a temporary spare or full-size spare tire is stored in the sunken well.

The above noted and other objects and features of the present invention will be more apparent as the present invention is further revealed in the accompanying drawings and detailed description.

DETAILED DESCRIPTION OF THE [PREFERRED EMBODIMENT] INVENTION

Figure 6:
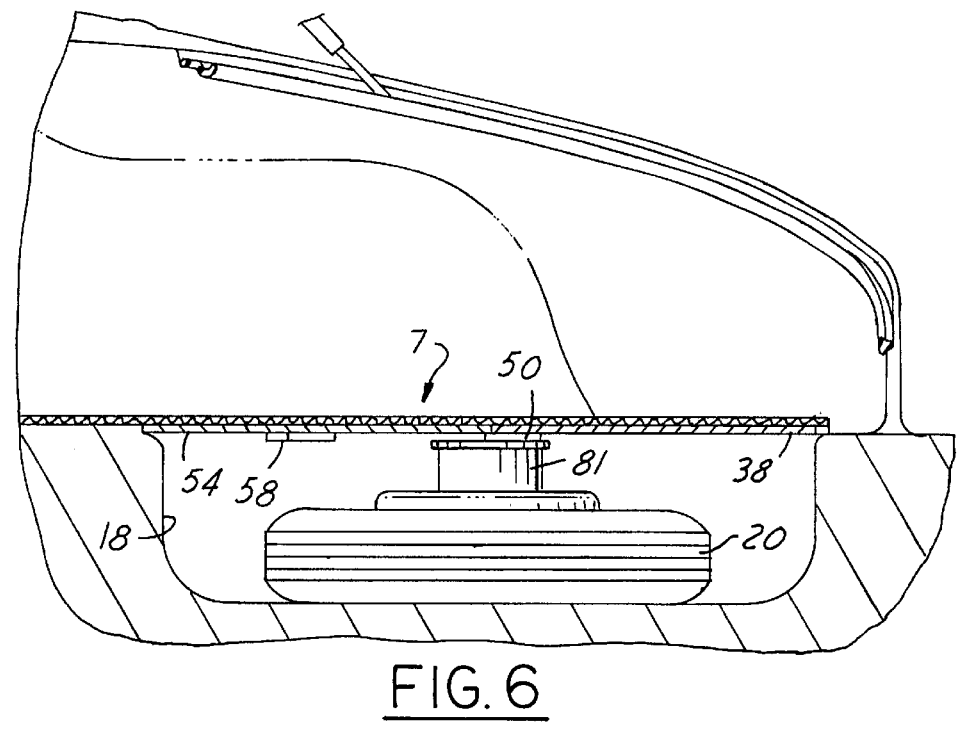
FIG. 6 is a sectional view of the trunk floor in the vehicle of the present invention when the liner is covering a temporary spare tire.
Figures 7, 8:
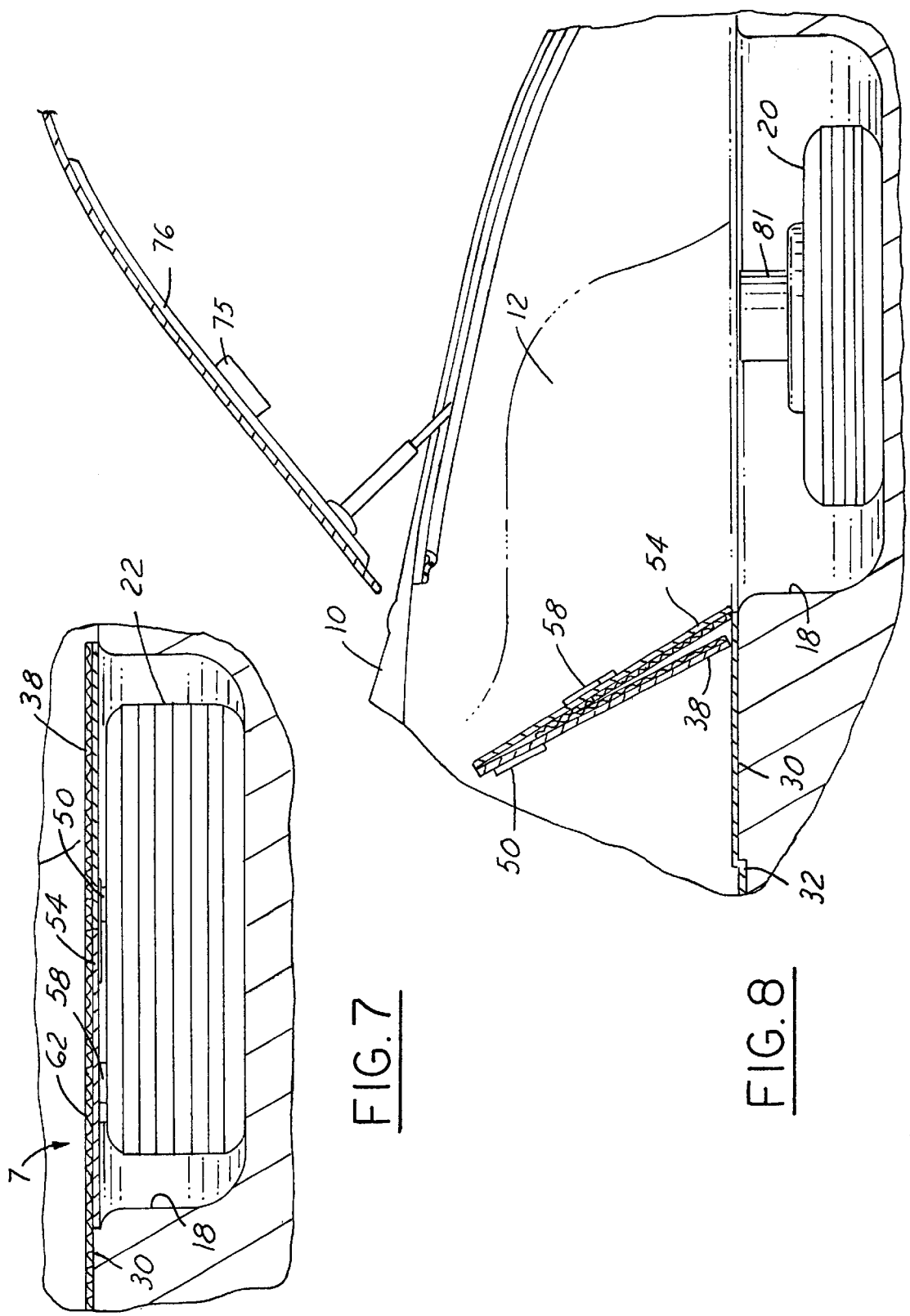
FIG. 7 is a view similar to FIG. 6 illustrating storage of a full size spare tire.
FIG. 8 is a sectional view illustrating the position of various components of the present invention when the front and rear boards of the carpet liner are folded in an upright position as shown in FIG. 4.

Referring to FIGS. 1–8, an automotive vehicle 10 has a trunk region 12. The trunk region 12 has a trunk floor 14. The trunk floor 14 has a rear portion 16. The trunk floor rear portion 16 has a sunken well 18 for storage of a spare tire. The sunken well 18 is large enough to accommodate a temporary spare tire 20 as shown in FIG. 6 or a full-size spare tire 22 as shown in FIG. 7. The trunk floor rear portion 16 also has a recessed plateau 24, which at least on two sides borders the adjacent sunken well 18. Laterally adjacent to the sunken well 18 and to the recessed plateau 24 is a side section 28. As best shown in FIGS. 7 and 8, the trunk floor 14 has a front portion 30 with a forward slight step 32. The trunk floor front portion 30 is laterally bordered by raised wheel wells 34. The trunk floor rear portion 16 has a first width 48 inclusive of the side sections 28. The trunk floor front portion 30 has a second width that is less than the first width.

To cover the trunk floor 14, there is provided a trunk liner 7 according to the present invention. The trunk liner 7 has a rear or first board 38. The first board 38 is generally rigid and can be fabricated by ⅛ to ¼ inch thick, fiberboard or other generally rigid material. The first board 38 has a rear edge 40. The rear edge 40 has a cut-out 42 to allow a vehicle operator to pull up the first board 38. The first board 38 on a lower surface 37 which faces the sunken well 18 has printed instructions 44 for the installation of the spare tire and also includes instructions for proper operation of a jack and wheel lug wrench (not shown). The first board 38 has a width 49 [which spans over the sunken well 18]. The width of the first board 38 extends over a region of the trunk floor rear portion 16 between the side sections 28 as well as spanning over the sunken well 18. The first board 38 has lateral side edges 45 which allow the first board 38 to be positionally aligned adjacent to or on the recessed plateau 24. The first board 38 has a pair of support [blocks] pads 50 which allow the first board 38 to be supported on top of a full-size spare tire 22 as shown in FIG. 7. The first board 38 also has a front edge 52 that extends over the sunken well 18.

The trunk liner 7 also has a second generally rigid board 54. The second board 54 has a width spanning over the sunken well 18. The second board 54 is fabricated from the same material as the first board 38. The second generally rigid board 54 has a rear edge 56. The second board rear edge 56 extends over the sunken well 18 and is adjacent to and foldably connected to a front edge 52 of the first board 38. The second board 54 also has pads 58 for supporting contact with a full-size spare tire 22 as shown in FIG. 7.

Extending over the first board 38 and the second board 54 and connected thereto is a generally flexible membrane cover 60. The membrane cover 60 is carpeted on its top end 62. Membrane cover 60 is covered with sound installation 64 on its bottom end. The cover 60 also extends over the trunk floor rear portion plateau 24 and side sections 28. The cover 60 also extends over the trunk floor front portion 30. At its forward end, the cover 60 has a press form step 66 to fit over the step 32 of the trunk floor 14. The fit of the cover 60 within the trunk floor 14 essentially maintains it in a proper position.

To install the trunk liner 7 in the trunk 12, the vehicle assembler simply places trunk liner 7 in alignment with the trunk floor 14. The trunk liner 7 has lateral wings 78 which extend over the side sections 28 of the rear portion of the trunk floor 14. As previously mentioned the first board 38 and second board 54 are aligned by resting within the recessed plateaus 24 of the vehicle floor. Therefore, alignment of the trunk liner 7 is very easy to establish by the vehicle assembler and typically no further means of attachment of the trunk liner 7 will be required. When a temporary spare tire 20 is being stored in the sunken well 18, a cylindrical tube 81 functions as a central support to hold up the first and second boards 38, 54. When a full-size spare tire 22 is stored in the sunken well 18, the tire 22 will hold up the boards 38, 54 via pads 50 and 58.

Figure 1:
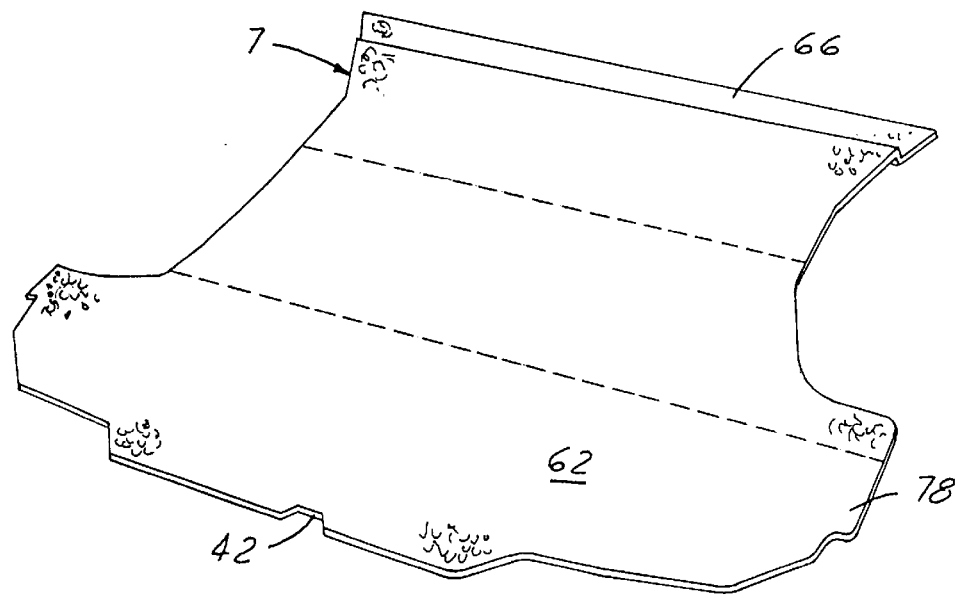
FIG. 1 is a perspective top view of a preferred embodiment automotive vehicle trunk floor liner according to the present invention.
Figure 2:
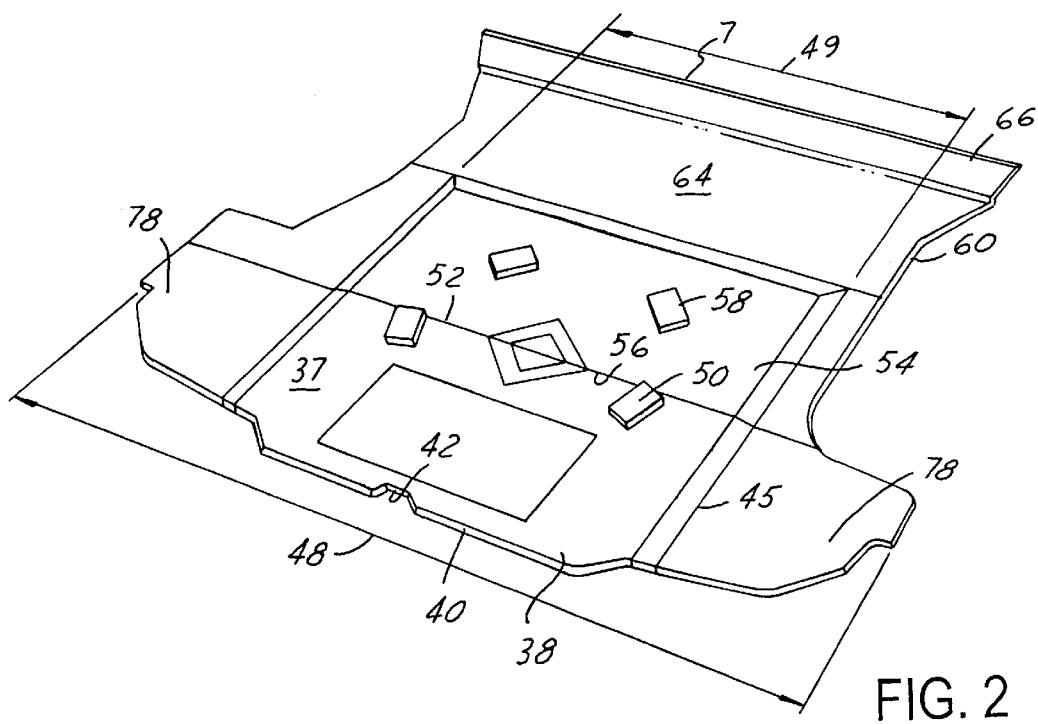
FIG. 2 is a bottom perspective view of the trunk liner shown in FIG. 1.
Figure 3:
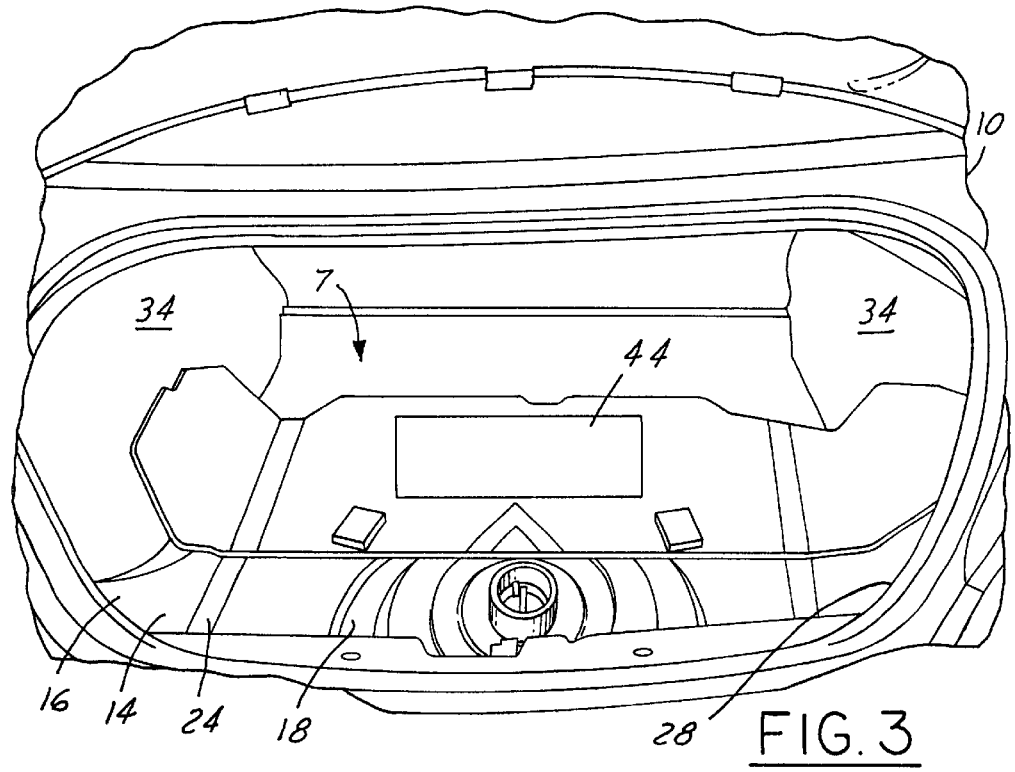
FIG. 3 is a perspective view of the trunk liner shown in FIG. 1 installed within a trunk region of an automotive vehicle with a first rear board folded over a second front board.
Figure 4:
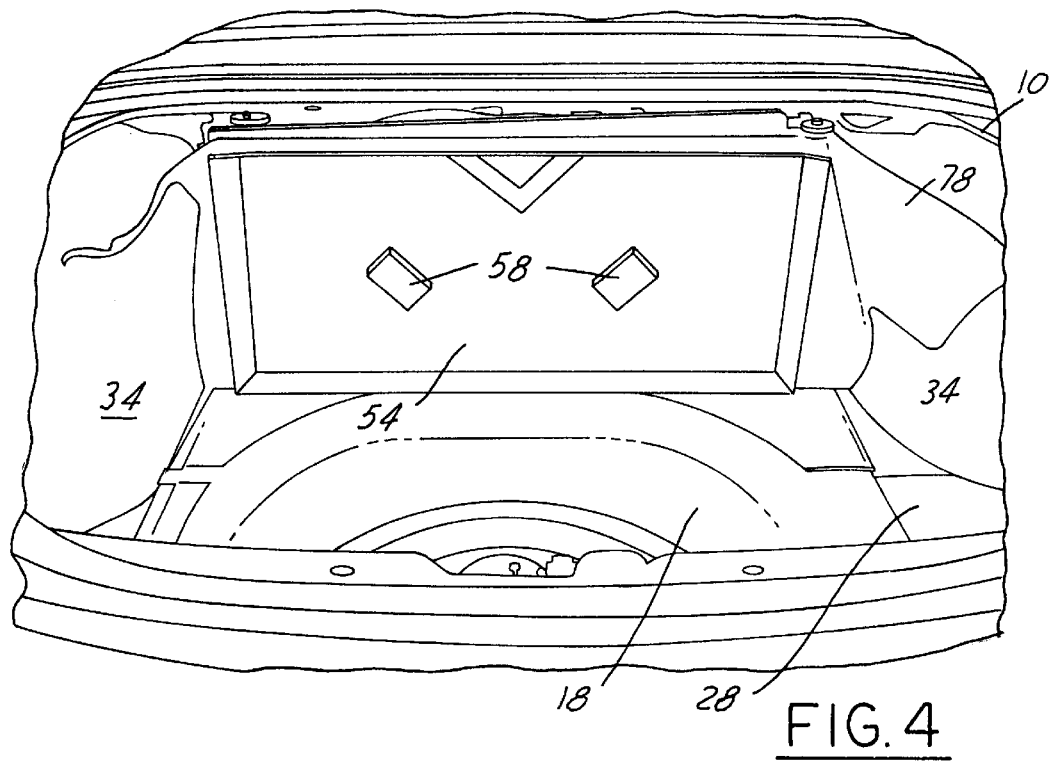
FIG. 4 is a view similar to that of FIG. 3 illustrating the generally upright position of the front and rear boards when a spare tire is being removed from the sunken well of the trunk.
Figure 5:
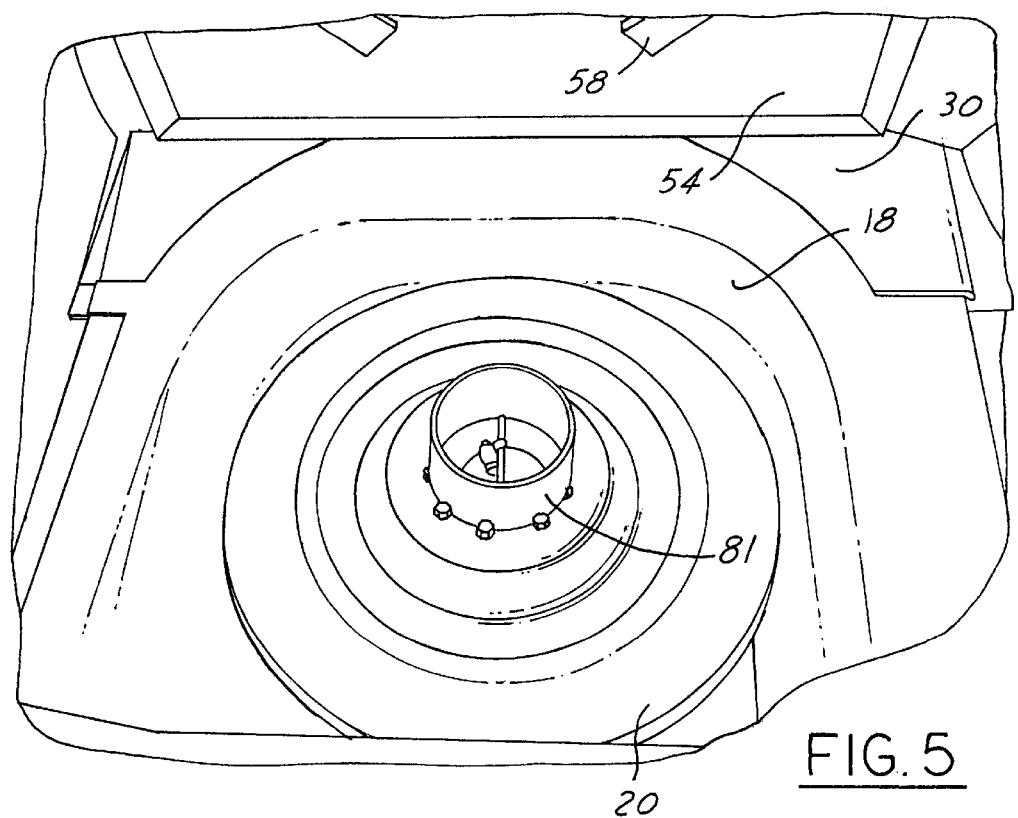
FIG. 5 is a perspective view of the sunken well illustrating the storage of a temporary spare tire.

To access the spare tire within the sunken well 18, a vehicle operator will reach their hand into the handle cut-out 42 on the front end of the trunk liner first board 38. The first board 38 can be folded over on top of the second board 54 as shown in FIG. 1. In this position, the printed instructions 44 will be visible to the vehicle operator who desires to change a tire. A trunk light 75 (FIG. 8) positioned underneath a trunk lid 76 or in another appropriate position will illuminate the printed instructions 44. To remove the spare tire 20 or 22, the first board and second boards are folded upwards to a generally upright position adjacent to the wheel wells 34 (FIGS. 4 and 8). The flaps 78 will generally fold up and hold the first and second boards in the upright position to allow for easy removal of the spare tire.

The automotive vehicle trunk liner 7 of the present invention has been shown in a preferred embodiment. However, it will become apparent to those skilled in the art that various modifications can be made to the present invention without departing from the spirit or scope of the present invention as it is encompassed in the specification and drawings and by the following claims.

I claim:

1. A trunk liner for a trunk region of an automotive vehicle, the vehicle trunk having a floor with a rear portion having a sunken well for storage of a spare tire, the trunk floor rear portion having side sections laterally adjacent the sunken well giving the trunk floor rear portion a first width, the trunk floor having a front portion laterally bordered by raised wheel wells of the vehicle, the trunk floor front portion having a second width less than the first width, said trunk liner comprising:

a first generally rigid board having a width spanning over the sunken well, said first rigid board extending over a region of the trunk floor rear portion between the trunk floor rear portion side sections, said first rigid board having a front edge extending over the sunken well;

a second generally rigid board having a width spanning over the sunken well, said second board having a rear edge being foldably connected with said front edge of said first board; and a membrane cover connected with and extending over said first and second boards and the trunk floor rear portion side sections, and said membrane cover extending over the trunk floor front portion.

2. A trunk liner as described in claim 1 wherein said first and second boards are connected by said membrane cover.

3. A trunk liner for a trunk region of an automotive vehicle, the vehicle trunk having a floor with a rear portion having a sunken well for storage of a spare tire, the trunk floor rear portion having side sections laterally adjacent the sunken well giving the trunk floor rear portion a first width, the trunk floor having a front floor portion laterally bordered by raised wheel wells of the vehicle, the trunk floor front portion having a second width less than the first width, said trunk liner comprising;

a first generally rigid board having a width spanning over the sunken well, said first board extending over a region of the trunk floor rear portion between the trunk floor rear side sections, said first board having a front edge extending over the sunken well, said first board having printed tire installations on a side of said first board facing the sunken well;

a second generally rigid board having a width spanning over the sunken well, said second board having a rear edge adjacent with a front edge of said first board;

a generally flexible carpet cover connected with and extending over said first and second boards and the trunk floor rear portion side sections and the trunk floor front portion, said carpet foldably connecting said first board with said second board; and wherein said first board and said second board can be folded into a generally upright position adjacent the vehicle wheel wells to allow removal of the spare tire from the sunken well.

4. An automotive vehicle with a rear trunk, said vehicle trunk having a floor with a rear portion having a sunken well for storage of a spare tire, said trunk floor rear portion having side sections laterally adjacent said sunken well giving said trunk floor rear portion a first width, said trunk floor having a front portion laterally bordered by raised wheel wells of said vehicle, said trunk floor front portion having a second width less than said first width, said vehicle having a trunk liner installed therein, said trunk liner including:

a first generally rigid board having a width spanning over said sunken well extending over a region of said trunk floor rear portion between said trunk floor rear portion side sections, said first board having a front edge extending over said sunken well, and said first board having lateral edges;

a second generally rigid board having a width spanning over said sunken well, said second board having a rear edge foldably connected with said front edge of said first board, and said second board having lateral edges;

a membrane cover connected with and extending over said first and second boards and said trunk floor rear portion side sections, and said membrane cover extending over said trunk floor front portion; and wherein said trunk floor has a recessed plateau for receiving said lateral edges of said first and second boards adjacent said sunken well.

5. An automotive vehicle as described in claim 4, wherein there is at least one pad on one of said boards and wherein said pad supports one of said boards on a full-size spare tire stored within said sunken well.

6. An automotive vehicle as described in claim 4, wherein there is a central support tube placed within said sunken well for supporting at least one of said boards above said sunken well when a temporary spare tire is stored within said sunken well.

7. An automotive vehicle as described in claim 4, wherein there are tire installation instructions printed on a surface of said first board facing said sunken well and wherein said trunk has a light to illuminate said instructions wherein said first board is folded on top of said second board.

8. An automotive vehicle as described in claim 4, wherein said first and second boards can be placed in a generally upright position when folded up adjacent said wheel wells.

9. A trunk liner for a trunk region of an automotive vehicle, the vehicle trunk having a floor with a rear portion having a sunken well for storage of a spare tire, the trunk floor rear portion having side sections laterally adjacent the sunken well giving the trunk floor rear portion a first width, the trunk floor having a front portion laterally bordered by raised wheel wells of the vehicle, the trunk floor front portion having a second width less than the first width, said trunk liner comprising:

a first generally rigid board having a width spanning over the sunken well, said first rigid board extending over a region of the trunk floor rear portion between the trunk floor rear portion side sections, said first rigid board having a front edge extending over the sunken well, said first rigid board having a pad to contact said tire in said sunken well;

a second generally rigid board having a width spanning over the sunken well, said second board having a rear edge being foldably connected with said front edge of said first board, said second rigid board having a pad to contact said tire in said sunken well; and a membrane cover connected with and extending over said first and second boards and the trunk floor rear portion side sections, and said membrane cover extending over the trunk floor front portion.

10. A trunk liner as described in claim 9 wherein said membrane cover provides carpeting for the trunk.

11. A trunk liner as described in claim 9 additionally having sound insulation connected with said membrane cover.

12. A trunk liner as described in claim 9 wherein instructions for installing the spare tire are printed on a side of said first board generally opposite said cover.

13. A trunk liner as described in claim 9 wherein said first board can be folded on top of said second board.

14. A trunk liner as described in claim 9 wherein said first and second boards can be folded into a generally upright position adjacent the wheel wells to allow removal of the spare tire from the sunken well.

15. An automotive vehicle with a rear trunk, said vehicle trunk having a floor with a rear portion having a sunken well for storage of a spare tire, said trunk floor rear portion having side sections laterally adjacent said sunken well giving said trunk floor rear portion a first width, said trunk floor having a front portion laterally bordered by raised wheel wells of said vehicle, said trunk floor front portion having a second width less than said first width, said vehicle having a trunk liner installed therein, said trunk liner including:

a first generally rigid board having a width spanning over said sunken well extending over a region of said trunk floor rear portion between said trunk floor rear portion side sections, said first board having a front edge extending over said sunken well, and said first board having lateral edges;

a second generally rigid board having a width spanning over said sunken well, said second board having a rear edge foldably connected with said front edge of said first board;

a membrane cover connected with and extending over said first and second boards and said trunk floor rear portion side sections, and said membrane cover extending over said trunk floor front portion; and a central support to be placed within said sunken well for supporting at least one of said boards above said sunken well when a temporary spare tire is stored within said sunken well.

\* \* \* \* \*